US007508378B2

(12) United States Patent
Tsukada

(10) Patent No.: US 7,508,378 B2
(45) Date of Patent: Mar. 24, 2009

(54) REMOTE CONTROL SYSTEM, REMOTE CONTROL OPERATING DEVICE, AND REMOTE CONTROL METHOD

(75) Inventor: Kazuya Tsukada, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 732 days.

(21) Appl. No.: 10/670,727

(22) Filed: Sep. 26, 2003

(65) Prior Publication Data

US 2004/0061679 A1 Apr. 1, 2004

(30) Foreign Application Priority Data

Sep. 26, 2002 (JP) .......................... P2002-282055

(51) Int. Cl.
*G06F 3/02* (2006.01)

(52) U.S. Cl. ........................ 345/169; 345/158; 348/734

(58) Field of Classification Search ................ 345/156, 345/169, 158; 348/564-565, 734
See application file for complete search history.

(56) References Cited

U.S. PATENT DOCUMENTS 6,597,374 B1 * 7/2003 Baker et al. ................ 715/717
2001/0010516 A1 * 8/2001 Roh et al. .................. 345/169
2001/0033243 A1 10/2001 Harris et al.
2002/0075416 A1 * 6/2002 Matsumoto et al. ......... 348/734
2002/0081092 A1 * 6/2002 Ozawa et al. ................ 386/46
2002/0149704 A1 * 10/2002 Kano et al. ................ 348/706
2003/0020693 A1 * 1/2003 Nashida et al. ............ 345/169
2003/0056215 A1 * 3/2003 Kanungo .................... 725/38
2004/0008198 A1 * 1/2004 Gildred ...................... 345/419

FOREIGN PATENT DOCUMENTS

EP 1 061 490 A2 12/2000
JP 5-236366 A 9/1993
JP 07-236096 A 9/1995
JP 08-079847 A 3/1996
JP 2000-41196 A 2/2000
JP 2002-191082 A 7/2002

* cited by examiner

*Primary Examiner*—Richard Hjerpe
*Assistant Examiner*—Kimnhung Nguyen
(74) *Attorney, Agent, or Firm*—Sughrue Mion, PLLC

(57) ABSTRACT

The present invention is provided with an input device for inputting connection information between information processing equipment and information reproduction equipment connected to the information processing equipment, a storage device for storing the connection information and an output device for outputting the connection information; and a control unit having a recognition device for recognizing the connection between the information processing equipment and the information reproduction equipment connected to the information processing equipment, based on the connection information output from the remote control operating unit.

5 Claims, 11 Drawing Sheets

FIG. 8A

| DEVICE | DEFAULT FUNCTION | SELECTABLE SETTING | | |
|---|---|---|---|---|
| DVR | DVR/VCR1 | DVR/VCR1 | | NONE |
| VCR1 | VCR2 | VCR2 | | NONE |
| TV | TV/SAT | TV/SAT | | NONE |
| CD | NONE | CD | | NONE |
| TUNER | NONE | TUNER | | NONE |

FIG. 8B

| DEVICE | DEFAULT FUNCTION | SELECTABLE SETTING | | |
|---|---|---|---|---|
| DVD | NONE | DVD/LD | FRONT | NONE |
| LD | NONE | DVD/LD | | NONE |
| STB | NONE | DVD/LD | FRONT | NONE |
| CS | NONE | DVD/LD | FRONT | NONE |
| VCR2 | NONE | DVD/LD | FRONT | NONE |
| MD | NONE | CDR/TAPE1 | MD/TAPE2 | NONE |
| TAPE1 | NONE | MD/TAPE2 | | NONE |

FIG. 9

| CODE | | | | |
|---|---|---|---|---|
| 1 | START | | ACCC+AF30 | |
| 2 | HEADER | | ABA1 | |
| 3 | DATA 0<br>bit 3<br>bit 2<br>bit 1<br>bit 0 | VCR1 DEFINITION BIT<br>} VCR2 DEFINITION BIT | | NO CONNECTION=0<br>CONNECTION=1<br>} NONE=0, LD=1<br>STB=2, VCR2=3<br>DVD=8, CS=7 |
| 4 | DATA 1<br>bit 3<br>bit 2<br>bit 1<br>bit 0 | DVR DEFINITION BIT<br>} FRONT DEFINITION BIT | | NO CONNECTION=0<br>CONNECTION=1<br>} NONE=0, DVD=1<br>VCR2=2, STB=3 |
| 5 | DATA 2<br>bit 3<br>bit 2<br>bit 1<br>bit 0 | TV/SAT DEFINITION BIT<br>CD DEFINITION BIT<br>} TAPE1 DEFINITION BIT | | NO CONNECTION=0<br>CONNECTION=1<br>NO CONNECTION=0<br>CONNECTION=1<br>} NONE=0, MD=1 |
| 6 | DATA 3<br>bit 3<br>bit 2<br>bit 1<br>bit 0 | } TAPE2 DEFINITION BIT<br>TUNER DEFINITION BIT<br>—— | | } NONE=0, MD=1<br>TAPE1 =3<br>NO CONNECTION=0<br>CONNECTION=1<br>(don't care) |
| 7 | CHECK SUM | | | |
| 8 | END | | ADCC+AF3E | |

FIG. 10

DATA 0

| | | |
|---|---|---|
| ABA 0 | NO CONNECTION | NO CONNECTION |
| ABA 1 | ↑ | CONNECT LD |
| ABA 2 | ↑ | CONNECT STB |
| ABA 3 | ↑ | CONNECT VCR2 |
| ABA 4 | (UNUSED) | |
| ABA 5 | (UNUSED) | |
| ABA 6 | NO CONNECTION | CONNECT DVD |
| ABA 7 | ↑ | CONNECT CS |
| ABA 8 | CONNECT VCR1 | NO CONNECTION |
| ABA 9 | ↑ | CONNECT LD |
| ABA A | ↑ | CONNECT STB |
| ABA B | ↑ | CONNECT VCR2 |
| ABA C | (UNUSED) | |
| ABA D | (UNUSED) | |
| ABA E | CONNECT VCR1 | CONNECT DVD |
| ABA F | ↑ | CONNECT CS |

FIG. 11

DATA 1

| | FUNC: DVR/VCR1 | FUNC: FRONT |
|---|---|---|
| ABA 0 | NO CONNECTION | NO CONNECTION |
| ABA 1 | ↑ | CONNECT DVD |
| ABA 2 | ↑ | CONNECT VCR2 |
| ABA 3 | ↑ | CONNECT STB |
| ABA 4 | (UNUSED) | |
| ABA 5 | NO CONNECTION | CONNECT CS |
| ABA 6 | (UNUSED) | |
| ABA 7 | (UNUSED) | |
| ABA 8 | CONNECT DVR | NO CONNECTION |
| ABA 9 | ↑ | CONNECT DVD |
| ABA A | ↑ | CONNECT VCR2 |
| ABA B | ↑ | CONNECT STB |
| ABA C | (UNUSED) | |
| ABA D | CONNECT DVR | CONNECT CS |
| ABA E | (UNUSED) | |
| ABA F | (UNUSED) | |

FIG. 12

DATA 2

| | FUNC: TV/SAT | FUNC: CD | FUNC: TAPE1 |
|---|---|---|---|
| ABA 0 | NO CONNECTION | NO CONNECTION | NO CONNECTION |
| ABA 1 | ↑ | ↑ | CONNECT MD |
| ABA 2 | (UNUSED) | | |
| ABA 3 | (UNUSED) | | |
| ABA 4 | ↑ | CONNECT CD | NO CONNECTION |
| ABA 5 | ↑ | ↑ | CONNECT MD |
| ABA 6 | (UNUSED) | | |
| ABA 7 | (UNUSED) | | |
| ABA 8 | CONNECT TV | NO CONNECTION | NO CONNECTION |
| ABA 9 | ↑ | ↑ | CONNECT MD |
| ABA A | (UNUSED) | | |
| ABA B | (UNUSED) | | |
| ABA C | ↑ | CONNECT CD | NO CONNECTION |
| ABA D | ↑ | ↑ | CONNECT MD |
| ABA E | (UNUSED) | | |
| ABA F | (UNUSED) | | |

FIG. 13

DATA 3

| | FUNC: TAPE2 | FUNC: TUNER | FUNC: PHONO |
|---|---|---|---|
| ABA 0 | NO CONNECTION | NO CONNECTION | don't care |
| ABA 1 | NO CONNECTION | ↑ | |
| ABA 2 | NO CONNECTION | CONNECT TUNER | |
| ABA 3 | NO CONNECTION | ↑ | |
| ABA 4 | CONNECT MD | NO CONNECTION | |
| ABA 5 | CONNECT MD | ↑ | |
| ABA 6 | CONNECT MD | CONNECT TUNER | |
| ABA 7 | CONNECT MD | ↑ | |
| ABA 8 | CONNECT DAT | NO CONNECTION | |
| ABA 9 | CONNECT DAT | ↑ | |
| ABA A | CONNECT DAT | CONNECT TUNER | |
| ABA B | CONNECT DAT | ↑ | |
| ABA C | CONNECT TAPE1 | NO CONNECTION | |
| ABA D | CONNECT TAPE1 | ↑ | |
| ABA E | CONNECT TAPE1 | CONNECT TUNER | |
| ABA F | CONNECT TAPE1 | ↑ | |

REMOTE CONTROL SYSTEM, REMOTE CONTROL OPERATING DEVICE, AND REMOTE CONTROL METHOD

BACKGROUND OF THE INVENTION

1. Field of the Invention

The present invention relates to a remote control system, a remote control operating device, and a remote control method.

2. Description of the Related Art

In a conventional AV (Audio & Visual) amplifier, an input terminal is named beforehand, but even if any equipment is connected to any terminal, the AV amplifier becomes an operable state, thereby enabling operation of the equipment, unless the remote control operation is performed erroneously. Therefore, it is difficult for an operator to perform the remote control operation for selecting desired equipment without an error, unless the operator accurately understands which equipment is connected to which input terminal.

In the AV amplifier and the remote control operating device, even if the operator wants to watch a video connected to the AV amplifier, when the operator does not know to which terminal of the AV amplifier the video is connected, the operator must look for the terminal from which the image of the video is output, by changing over the selector of the amplifier each time. Therefore, there is a problem in that much stress is applied on the operator.

One example of problems that the present invention solves is an improvement in the user interface, on which it can be easily recognized which equipment is connected to which terminal of the AV amplifier.

SUMMARY OF THE INVENTION

The present invention has been made in view of the above circumstances, and an object of the present invention is therefore to provide a system, apparatus and method, which are directed to, by way of example, a remote control system.

The above object of the present invention can be achieved by a remote control system of the present invention. The remote control system is provided with a remote control operating unit having an input device for inputting connection information between information processing equipment and information reproduction equipment connected to the information processing equipment, a storage device for storing the connection information and an output device for outputting the connection information; and a control unit having a recognition device for recognizing the connection between the information processing equipment and the information reproduction equipment connected to the information processing equipment, based on the connection information output from the remote control operating unit.

According to the present invention, since the names of devices displayed on the remote control device 8 become the same names of the devices connected to the AV amplifier 1, the operability of the remote control device 8 for the operator is improved.

Furthermore, a specific name of equipment connected to the function of the AV amplifier 1 is displayed on the display of the remote control device 8, the operator can enjoy the audio system, without having much stress.

In one aspect of the present invention can be achieved by the remote control system of the present invention. The system is, wherein the remote control operating unit has a display device for displaying designation information indicating the information reproduction equipment, based on the connection information.

According to the present invention, a specific name of equipment connected to the function of the AV amplifier 1 is displayed on the display of the remote control device 8, the operator can enjoy the audio system, without having much stress.

In another aspect of the present invention can be achieved by the remote control system of the present invention. The system is, wherein the input device inputs the connection information set by an external setting unit.

According to the present invention, a specific name of equipment connected to the function of the AV amplifier 1 is displayed on the display of the remote control device 8, the operator can enjoy the audio system, without having much stress.

In further aspect of the present invention can be achieved by the remote control system of the present invention. The system is, wherein the remote control operating unit comprises a setting device for setting the connection information, and the input device inputs the connection information set by the setting device.

According to the present invention, a specific name of equipment connected to the function of the AV amplifier 1 is displayed on the display of the remote control device 8, the operator can enjoy the audio system, without having much stress.

In further aspect of the present invention can be achieved by the remote control system of the present invention. The system is, wherein the output device outputs a control signal for remote controlling the information processing equipment and the information reproduction equipment connected to the information processing equipment.

According to the present invention, even if the remote control device 8 and the AV amplifier 1 are apart from each other, desired remote control can be performed, due to the remote control through infrared rays.

According to the present invention, a remote control is also possible in the information processing equipment for AV.

Furthermore, since the power information of the equipment connected to the AV amplifier 1 can be obtained, the operability can be further improved.

In further aspect of the present invention can be achieved by the remote control system of the present invention. The system is, wherein the control unit controls the information processing equipment and the information reproduction equipment, based on a control signal output from the remote control operating unit, corresponding to the connection between the information processing equipment and the information reproduction equipment connected to the information processing equipment recognized by the recognition device.

According to the present invention, even if the remote control device 8 and the AV amplifier 1 are apart from each other, desired remote control can be performed, due to the remote control through infrared rays.

According to the present invention, a remote control is also possible in the information processing equipment for AV.

Furthermore, since the power information of the equipment connected to the AV amplifier 1 can be obtained, the operability can be further improved.

In further aspect of the present invention can be achieved by the remote control system of the present invention. The system is, wherein the information processing equipment has a detection device for detecting the presence of the information reproduction equipment connected to the information processing equipment, and a detection result output device for outputting the detection result by the detection device to the control unit.

According to the present invention, even if the remote control device 8 and the AV amplifier 1 are apart from each other, desired remote control can be performed, due to the remote control through infrared rays.

According to the present invention, a remote control is also possible in the information processing equipment for AV.

Furthermore, since the power information of the equipment connected to the AV amplifier 1 can be obtained, the operability can be further improved.

In further aspect of the present invention can be achieved by the remote control system of the present invention. The system is, wherein the detection result is power information of the information reproduction equipment.

According to the present information, since the power information of the equipment connected to the AV amplifier 1 can be obtained, the operability can be further improved.

The above object of the present invention can be achieved by a remote control operating unit, which controls the operation of information processing equipment and information reproduction equipment connected to the information processing equipment, of the present invention. The remote control operating device is provided with an input device used for inputting connection information between the information processing equipment and the information reproduction equipment; a storage device for storing the connection information; and a display device for displaying designation information indicating the information reproduction equipment, based on the connection information stored in the storage device.

According to the present invention, since the names of devices displayed on the remote control device 8 become the same names of the devices connected to the AV amplifier 1, the operability of the remote control device 8 for the operator is improved.

According to the present invention, a specific name of equipment connected to the function of the AV amplifier 1 is displayed on the display of the remote control device 8, the operator can enjoy the audio system, without having much stress.

The above object of the present invention can be achieved by a remote control method of the present invention. The present invention is provided with an input process for inputting connection information between information processing equipment and information reproduction equipment connected to the information processing equipment, and storing the information in a storage device in a remote control operating unit; an output process for outputting the connection information stored in the storage device; and a recognition process in which a control unit recognizes the connection between the information processing equipment and the information reproduction equipment connected to the information processing equipment, based on the connection information output from the remote control operating unit.

According to the present invention, since the names of devices displayed on the remote control device 8 become the same names of the devices connected to the AV amplifier 1, the operability of the remote control device 8 for the operator is improved.

According to the present invention, a specific name of equipment connected to the function of the AV amplifier 1 is displayed on the display of the remote control device 8, the operator can enjoy the audio system, without having much stress.

BRIEF DESCRIPTION OF THE DRAWING

FIG. 8A is function names of default by the device registration and selectable devices;

FIG. 8B is function names of default by the device registration and selectable devices;

FIG. 9 represents a data format;

FIG. 10 represents the contents of DATA0;

FIG. 11 represents the contents of DATA1;

FIG. 12 represents the contents of DATA2;

FIG. 13 represents the contents of DATA3; and

DESCRIPTION OF THE PREFERRED EMBODIMENTS

A preferred embodiment of the present invention will be described, with reference to FIG. 1 to FIG. 14.

Figure 1:
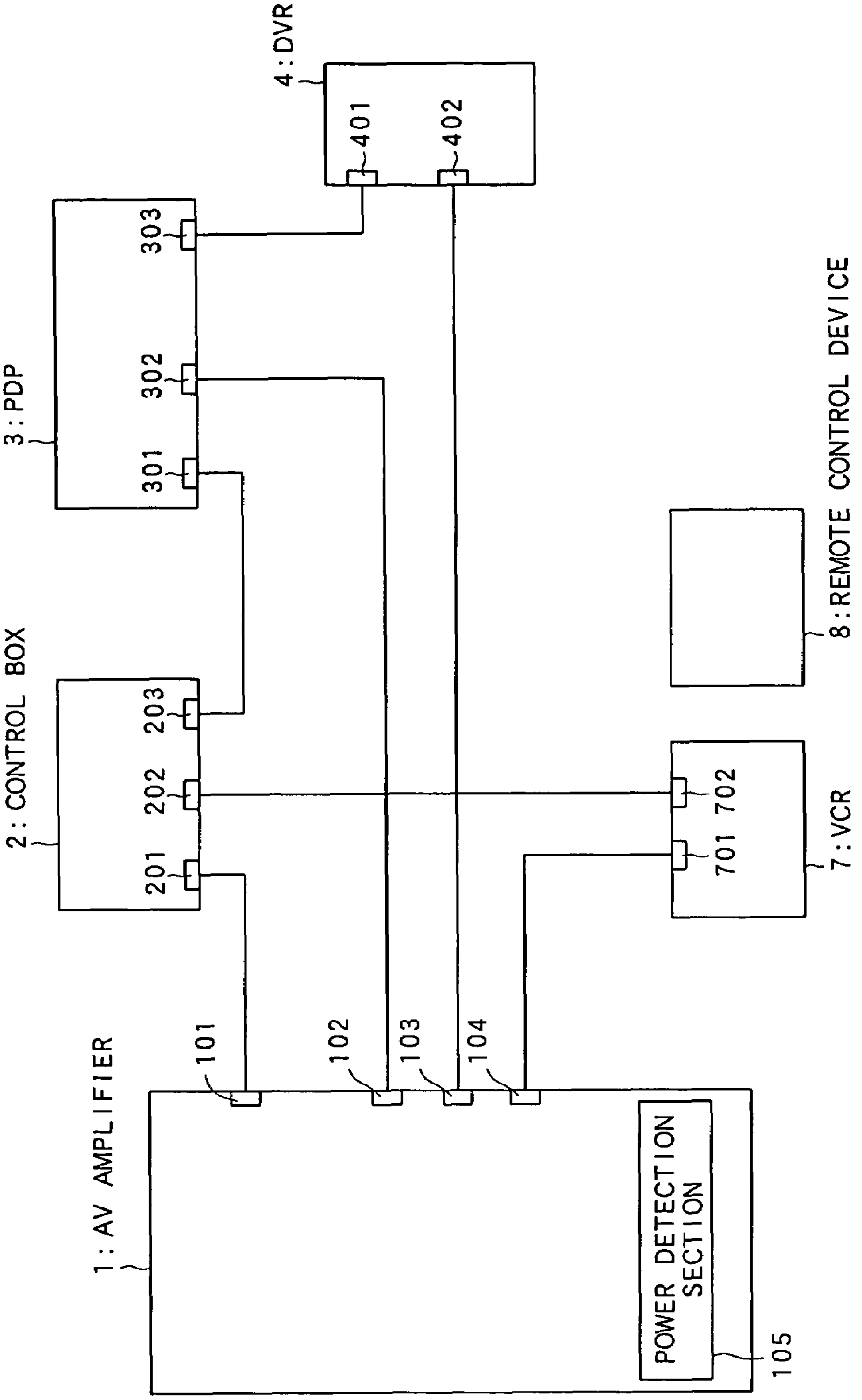
FIG. 1 is a block diagram of a first system configuration in one embodiment.

FIG. 1 is a block diagram of a system configuration example in the embodiment.

The system in FIG. 1 comprises an AV amplifier 1 as information processing equipment, a control box 2 as a control unit, a PDP (Plasma Display Panel) as information reproduction equipment, a DVR (Digital Versatile Disc (DVD) Recorder) 4 as information reproduction equipment, a VCR (Video Cassette Recorder) 7 as information reproduction equipment, and a remote control device 8 as a remote control operating device. This system is constructed such that a remote control signal transmitted from the remote control device 8 through infrared rays is input to the control box 2, and the control box 2 controls the respective equipment (hereunder referred to as devices), such as the AV amplifier 1, the PDP 3, the DVR 4 and the VCR 7, based on the signal.

The connection between the AV amplifier 1, the control box 2, the PDP 3, the DVR 4 and the VCR 7 in this system configuration example will be described below.

The AV amplifier 1 is a portion which amplifies a picture signal and a speech signal of the connected equipment, and in FIG. 1, picture signals and speech signals of the PDP 3, the DVR 4 and the VCR 7 are input.

The PDP 3 has a function as a media receiver (receiver) as well as an image display function, and in this embodiment, further has a function as a BS (Broadcasting Satellite) digital receiver. The PDP 3 and the DVR 4 transfer the picture signals and speech signals therebetween via a connector 303 and a connector 401. The PDP 3 and the AV amplifier 1 transfer the picture signals and speech signals therebetween via a connector 302 and a connector 102. The PDP 3 and the control box 2 transfer the picture signals, speech signals and other information therebetween via a connector 301 and a connector 203.

The DVR 4 is a DVD video recorder and reproducer, which can record and reproduce information recorded in the DVD. The DVR 4 and the AV amplifier 1 transfer the picture signals and speech signals therebetween via a connector 402 and a connector 103.

The VCR 7 is a video recorder and reproducer, which can record and reproduce picture by a cassette tape. The VCR 7 and the AV amplifier 1 transfer the picture signal and the speech signal via a connector 701 and a connector 104. The VCR 7 and the control box 2 transfer the picture signals and speech signals therebetween via a connector 702 and a connector 202.

The control box 2 and the AV amplifier 1 transfer the picture signals, speech signals and other information therebetween via a connector 201 and a connector 101.

The remote control device 8 transmits a remote control signal to a communication section 2B (see FIG. 3) in the control box 2 through infrared rays. The AV amplifier 1, the PDP 3, the DVR 4 and the VCR 7 then perform desired operation, such as recording, reproduction or display, based on the remote control signal input to the control box 2.

Figure 2:
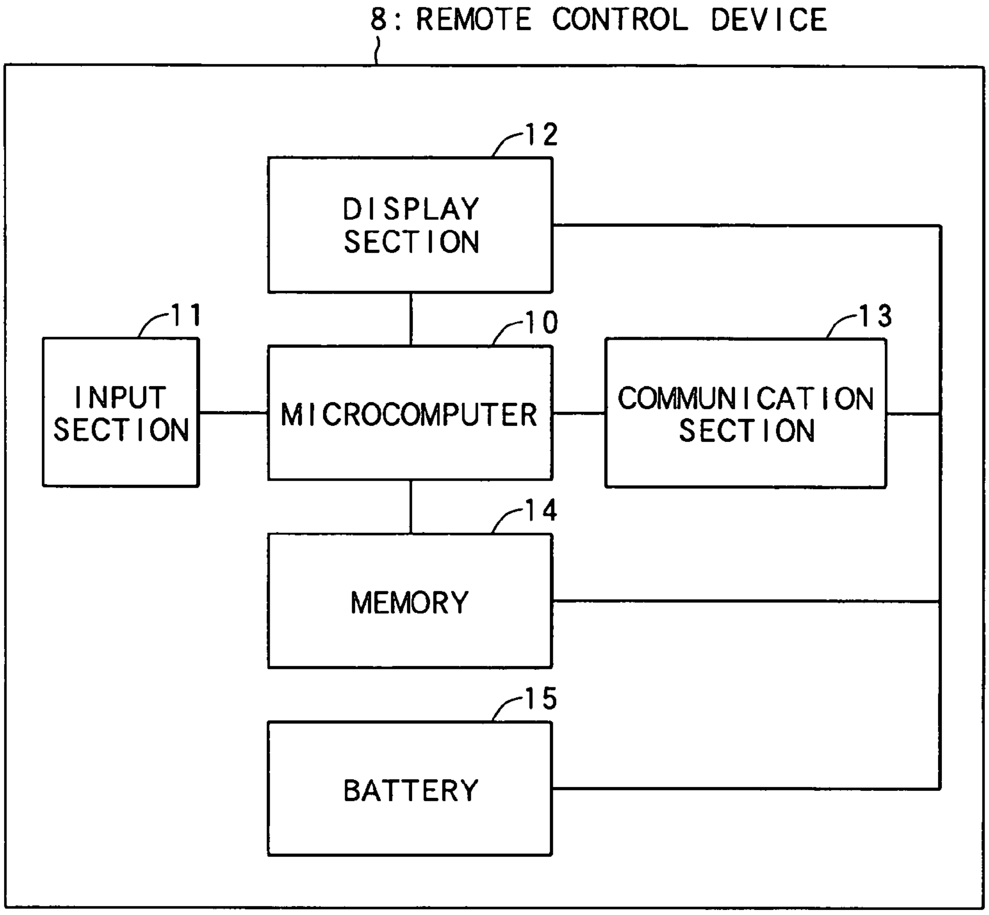
FIG. 2 is a block diagram of a remote control device.

FIG. 2 is a block diagram showing the configuration of the remote control device 8 in this embodiment. The remote control device 8 generally comprises a microcomputer 10, an input section 11 as an input device or a setting device for inputting the connection information, a display section 12 as a display device for displaying the instruction information, a communication section 13 as an output device, a memory 14 as a storage device for storing the connection information, and a battery 15. The memory 14 in the remote control device 8 stores data code downloaded from an external computer (not shown) via the input section 11. The remote control device 8 transmits the data code to the control box 2 via the communication section 13, so that the control box 2 can recognize the connection between the respective devices.

Figure 3:
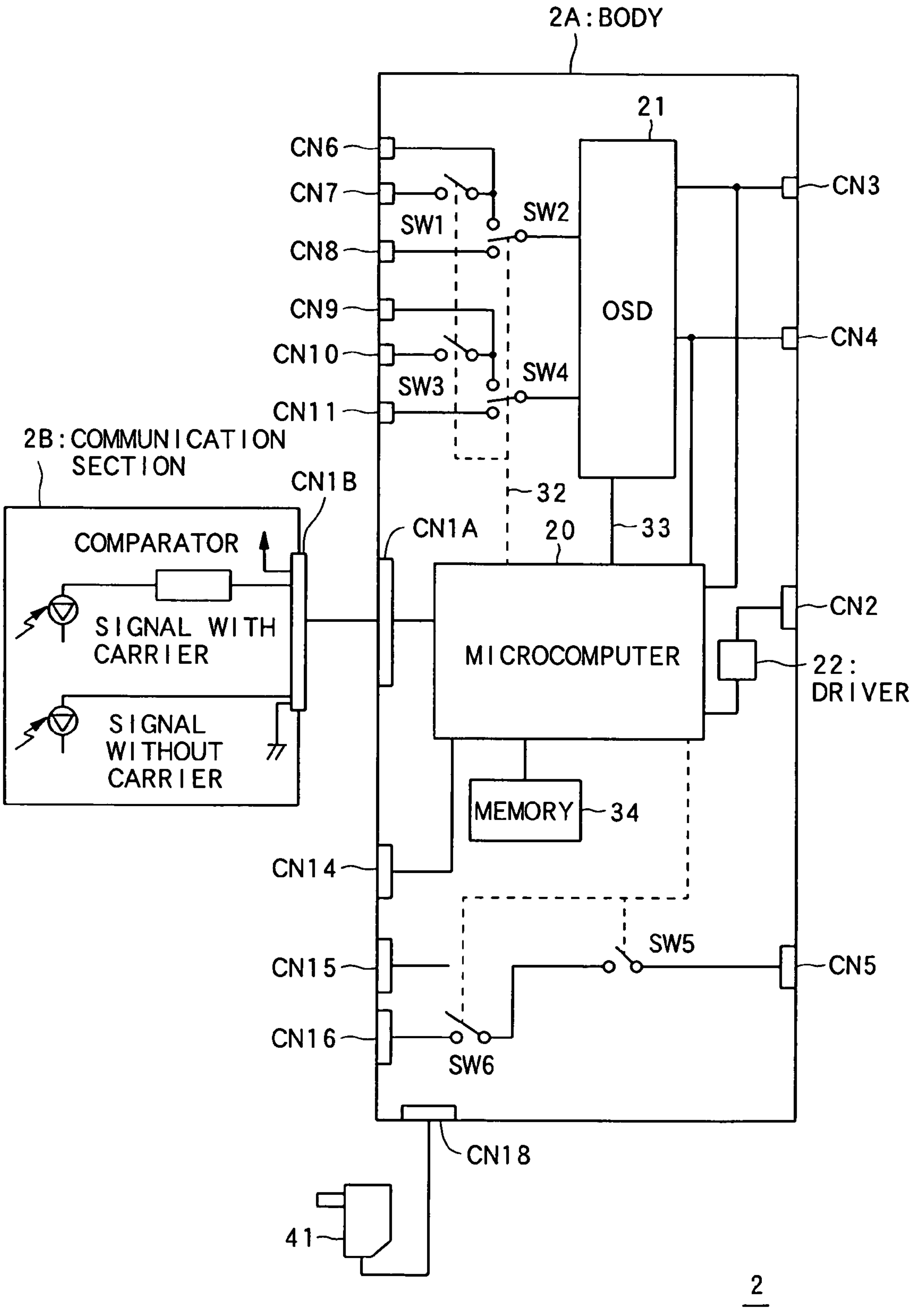
FIG. 3 is a block diagram of a control box.

FIG. 3 shows the configuration of the control box 2 in a block diagram.

The control box 2 comprises a body 2A and a communication section 2B, and the body 2A and the communication section 2B in the control box 2 are connected via a connector CN1A and a connector CN1B.

The body 2A roughly comprises a microcomputer 20, an OSD (On Screen Display) function part 21, a driver section 22, a power adapter 41, a memory 34, switches SW1 to SW6, the connector CN1A and connectors CN2 to CN11, and connectors CN14 to CN16.

The communication section 2B roughly comprises a light receiving section 35 for receiving the infrared signal from the remote control device 8, an amplifying section 36, a capacitor 37 and a connector CN1B.

The communication section 2B photo-detects the data code and the remote control signal (hereunder may be simply abbreviated as "signal") transmitted from the remote control device 8 by the light receiving section 35, amplifies only the data code by the amplifying section 36, and outputs the amplified data code to the connector CN1A of the body 2A via the connector CN1B. The body 2A inputs the signal to the microcomputer 20 via the connector CN1A, and based on the information obtained by the input signal, communicates with the control box 2 via the connector 201 of the control box 2 and the connector 101, being a detection result output device of the AV amplifier 1.

In other words, the control box 2 judges whether to output a picture signal of the VCR 7 connected with the connector CN6 to the PDP 3 via the switches SW2, the OSD 21 and the connector CN3, or to output a picture signal transmitted from a monitoring terminal of the AV amplifier 1 connected with the connector CN8 to the PDP 3 via the switches SW2, the OSD 21 and the connector CN3, based on the signal transmitted from the remote control device 8. If any information is necessary for the operation of the remote control device 8, the microcomputer 10 sends a command to the OSD 21 via a control signal 33, to output the necessary image information from the connector CN3 to the PDP 3.

Connectors CN7, CN8, CN10, CN11, CN14 and CN16 correspond to the connector 201 in the block diagram in FIG. 1, connectors CN6, CN9 and CN15 correspond to the connector 202 in the block diagram in FIG. 1, and connectors CN3, CN4 and CN5 correspond to the connector 203 in the block diagram in FIG. 1.

The processing in which the remote control device 8 downloads the data code from the external computer (not shown), transmits the data code to the control box 2, and outputs a message to the PDP 3 will be described below.

Figure 4:
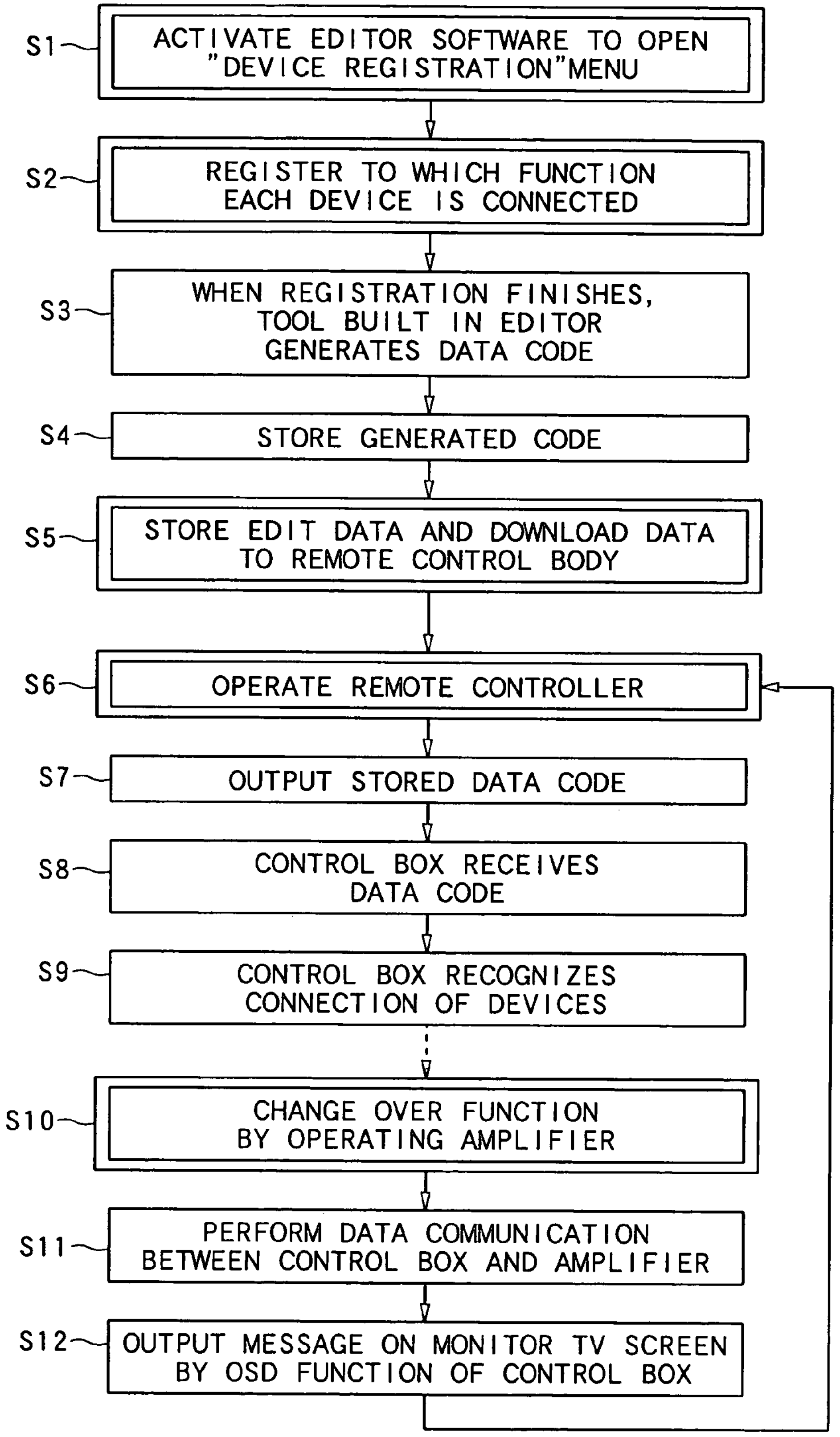
FIG. 4 is an operation flowchart of the remote control device in the embodiment.

FIG. 4 is an operation flowchart of the remote control device 8 in this embodiment. Moreover, screens displayed on the external computer are shown in FIGS. 5, 6 and 7.

Figure 5A:
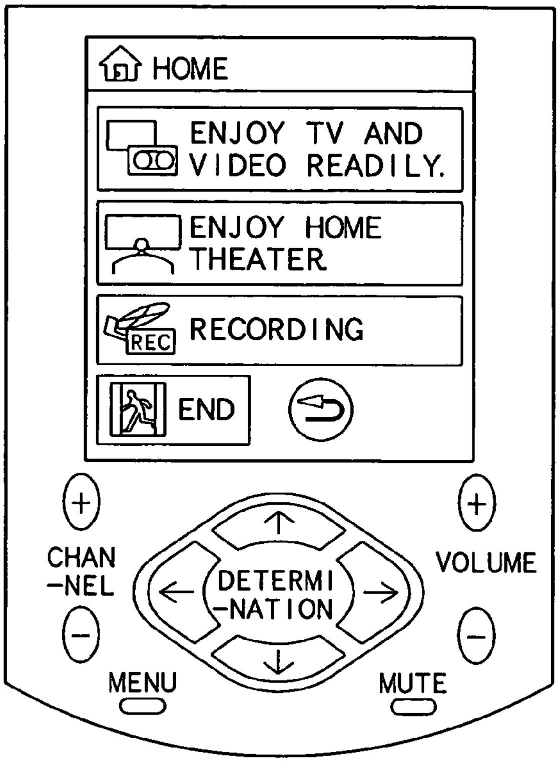
FIG. 5A is a plan view of the remote control device.
Figure 5B:
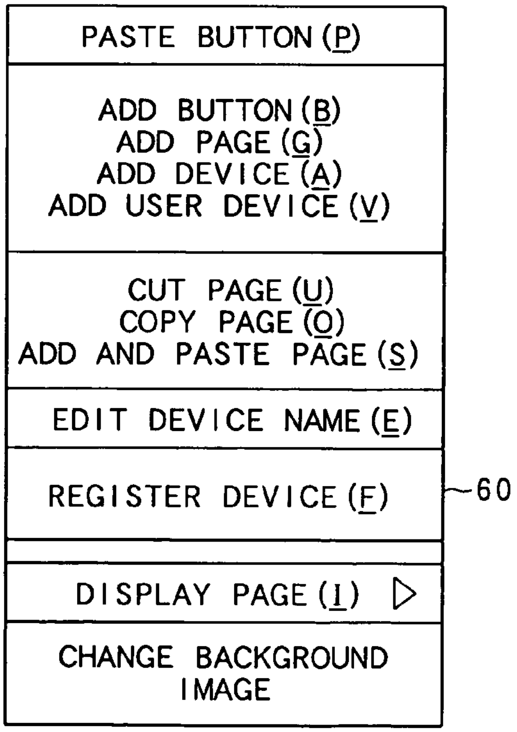
FIG. 5B is a pull-down menu of the remote control device.
Figure 6:
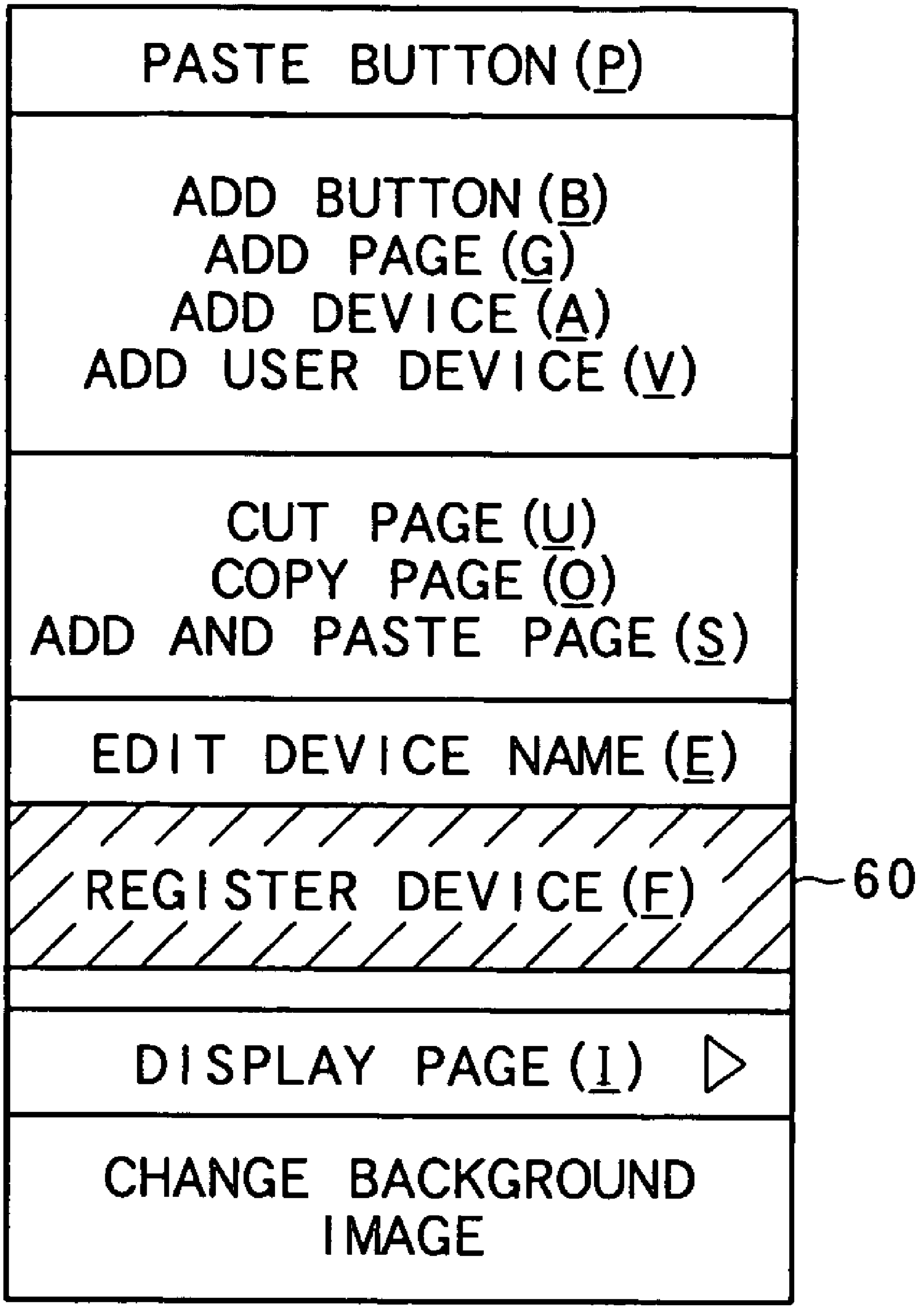
FIG. 6 is the pull-down menu, where a device registration is selected.

In step S1, the operator operates the external computer to activate the editor software to display the image of the remote control device 8 (FIG. 5A), and by the right-click of the mouse at a place other than the image of the remote control device 8, to display a pull-down menu (FIG. 5B). The operator then opens a "device registration" menu (FIG. 6) from the menu.

In step S2, the operator operates the external computer to register to which function name connector of the AV amplifier 1 the device connected to the AV amplifier 1 is connected, that is, to register the function names of the AV amplifier 1 and the device names connected thereto.

Specifically, when the operator selects the "device registration" menu from the pull-down menu, the external computer displays a device registration screen shown in FIG. 7. On this device registration screen, there are displayed a device name display column 61 for a device connectable to the AV amplifier 1, a display column 64 indicating a function name, which is a name corresponding to the connector of the AV amplifier shown in FIG. 1, a determination key 66 for determining the correspondence between the device name and the function name, and an end key 65 for terminating the device registration screen. The name of the connectors 101 to 104 of the AV amplifier 1 and connectors (not shown) is also referred to as a function, and names shown in FIG. 9 are registered for the functions beforehand in the editor software.

Figure 7A:
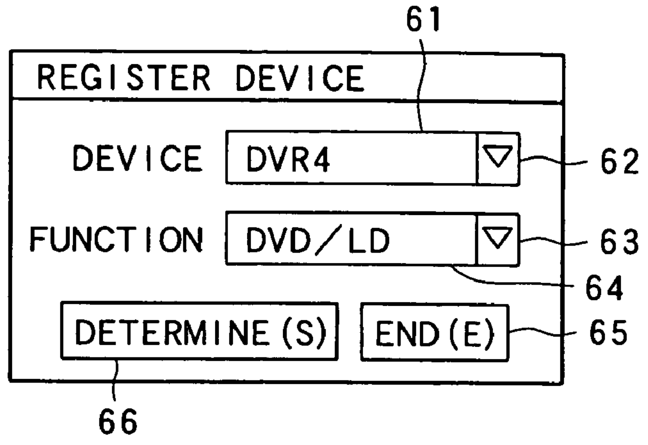
FIG. 7A is a device registration screen of the remote control device.
Figure 7B:
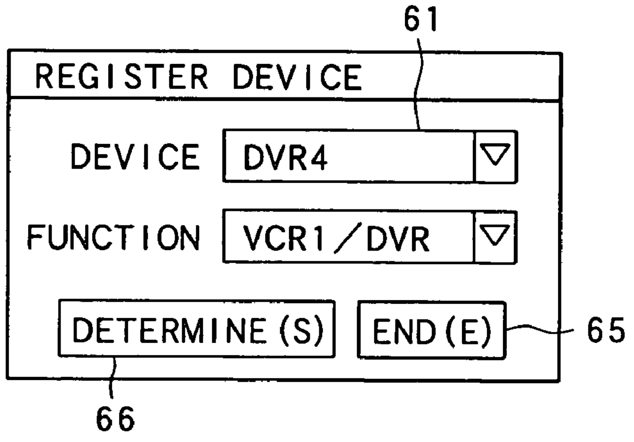
FIG. 7B is a device registration screen of the remote control device.
Figure 7C:
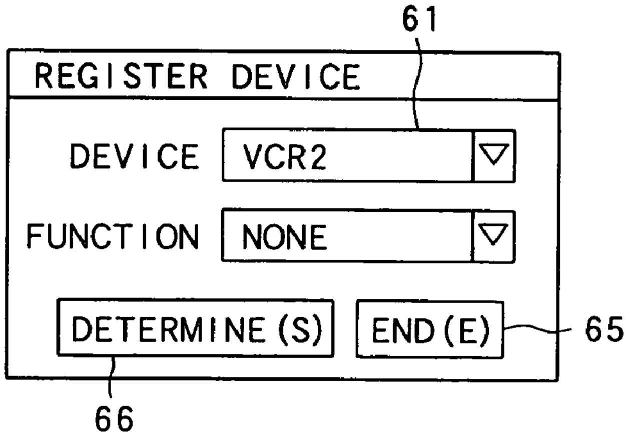
FIG. 7C is a device registration screen of the remote control device.

In FIG. 7A, the DVR 4 is displayed in the device name display column 61, and since the DVR 4 is connected to VCR1/DVR of the AV amplifier 1 in FIG. 1, VCR1/DVR is displayed in the function name display column 64 by operating the key 63 (FIG. 7B). In order to set VCR1/DVR in the function name display column 64 of the AV amplifier 1 corresponding to the DVR in the device name display column 61, the operator presses the determination key 66. In this manner, devices connected to all function columns of the AV amplifier 1 are registered. As shown in FIG. 7C, if there is no device connected to the function of the AV amplifier 1, the operator selects "None" in the function name display column 64, and presses the determination key 66. When registration of all devices is complete, the operator selects the end key 65 shown in FIG. 7C.

FIG. 8 shows the correspondence between the names of joining terminals of the AV amplifier 1 and devices connectable to the AV amplifier 1 in a table. The connectable devices include DVR (Digital Video Recorder), VCR (Video Cassette Recorder), TV (Television), DVD (Digital Versatile Disc player), LD (Laser Disc player), STB (Set Top Box), CS (Communication Satellite tuner), CD (Compact Disc Player), Tuner, MD (Mini Disc Player), and TAPE (Cassette Tape Player). The function names of the AV amplifier 1 include VCR1, VCR2, TV/SAT, PHONO, DVD/LD, FRONT, CD, TUNER, TAPE1 and TAPE 2. It is seen from the table that the device connectable to the function name VCR1 of the AV amplifier 1 is only the DVR, and devices connectable to the function name DVD/LD of the AV amplifier are DVD, LD, STB, CS and VCR. A new name may be created for the function name and the device name by the editor software, corresponding to the system configuration.

In FIG. 8A, with respect to input functions VCR1, VCR2, TV/SAT, CD, TUNER and PHONO of the AV amplifier 1, the connectable device is limited to one. Therefore, the presence of connection of a device is important with respect to these functions. Hence, the operator inputs whether there is a device to be connected to each function on the device registration screen. From FIG. 8B, it is seen that not only the presence of connection of a device, but also when there is a device connected thereto, which device is connected thereto are also important, since a plurality of connectable devices exists for DVD/LD, FRONT, TAPE1 and TAPE2, being the input functions of the AV amplifier 1 other than those shown in FIG. 8A. Therefore, the operator inputs whether there is a device to be connected to DVD/LD, FRONT, TAPE1 and TAPE2, and if there is a device connected thereto, the name thereof, on the device registration screen (FIGS. 7A to 7C).

In step S3, when registration of all devices is complete, the editor software in the external computer generates a data code indicating the relation of the connected device in the function name column.

In step S4, the external computer stores the generated data code.

In step S5, the external computer allows the data code to be downloaded to the remote control device 8, and stored in the memory 14 in the remote control device 8.

In step S7, the operator selects a device to be displayed on the PDP 3, and selects a device to be recorded or reproduced by the remote control device 8.

In this manner, the device name displayed on the remote control device 8 is the same device name connected to the AV amplifier 1, and hence the operability of the remote control device 8 for the operator is improved.

In step S8, the remote control device 8 transmits the data code stored in the memory 14 to the control box 2 via the communication section 13, in response to the operation of the operator.

In step S9, the control box 2 receives the data code by the communication section 2B.

In step S10, the control box 2 analyzes the received data code, and recognizes the connection between the AV amplifier 1 and the respective devices.

In step S11, the AV amplifier 1 detects the presence of devices to be connected to the functions of the AV amplifier 1. The detection operation is conducted in such a manner that a power detection section 105 detects whether a signal of each device is input to each function of the AV amplifier 1.

By the operation in step S11, the AV amplifier 1 detects whether a signal of each device set by the remote control device 8 is input to each function of the AV amplifier by the power detection section 105, and in step S12, the result thereof is transmitted between the connector 201 of the control box 2 and the connector 101 of the AV amplifier 1.

In step S13, when the power detection section 105 detects that a signal of a device selected by the control box 2 in step S12 is not input to the function of the AV amplifier 1, a command is transmitted from the microcomputer 20 in the control box 2 to the OSD section 21 via the control signal 33. As a result, a message, for example, "Please turn on the power of the cable" is displayed on the screen of the PDP3 via the connector CN3 from the OSD section 21, so that the operator is encouraged to turn on the power of the equipment selected by using the remote control device 8. In this manner, since a specific name of equipment connected to the function of the AV amplifier is displayed on the display of the remote control device 8 according to the present invention (in this embodiment, for example, "DVD4" is displayed), the operator can enjoy the audio system, without having much stress.

The format of the data code when communication is performed between the remote control device 8 and the control box 2 will be described with reference to FIG. 9 to FIG. 13.

FIG. 9 is a diagram showing the data format. As is seen from FIG. 9, the number of data is eight codes of from code 1 to code 8. The START code is composed of a combination of A0CCh and AF3Dh in the hexadecimal numeral, and the END code is composed of a combination of A0CCh and AF3Eh in the hexadecimal numeral. HEADER in the second code becomes a fixed value of ABA1h in the hexadecimal numeral in this embodiment. The HEADER code ABA1h means that the presence of a device connected to each function of the AV amplifier 1, and the device name when there is a device connected thereto is now to be transferred. The third code to the sixth code indicate the content of the data indicating the connection described above.

FIG. 10 indicates the contents of DATA0 in the third code, and indicates the connection between the functions VCR2 and DVD/LD of the AV amplifier 1 and the devices. It is shown that the value of the third code takes 16 values from ABA0h to ABAFh in the hexadecimal numeral. ABA0h indicates that any device is not connected to both of the functions VCR2 and DVD/LD of the AV amplifier 1. ABAFh indicates that the device VCR1 is connected to the function VCR2 of the AV amplifier 1, and the device CS tuner is connected to the function DVD/LD of the AV amplifier 1.

FIG. 11 indicates the contents of DATA1 in the fourth code, and indicates the connection between the functions DVD/VCR1 and FRONT of the AV amplifier 1 and the devices. It is shown that the value of the fourth code takes 16 values from ABA0h to ABAFh in the hexadecimal numeral. ABA0h indicates that any device is not connected to both of the functions DVD/VCR1 and FRONT of the AV amplifier 1. ABAFh indicates that the device DVR is connected to the function DVD/VCR1 of the AV amplifier 1, and the device CS tuner is connected to the function FRONT of the AV amplifier 1.

FIG. 12 indicates the contents of DATA2 in the fifth code, and indicates the connection between the functions TV/SAT, CD and TAPE1 of the AV amplifier 1 and the devices. It is shown that the value of the fifth code takes 16 values from ABA0h to ABAFh in the hexadecimal numeral. ABA0h indicates that any device is not connected to any of the functions TV/SAT, CD and TAPE1 of the AV amplifier 1. ABAFh indicates that the device TV is connected to the function TV/SAT, the device CD is connected to the function CD, and the device MD is connected to the function TAPE1, of the AV amplifier 1.

FIG. 13 indicates the contents of DATA3 in the sixth code, and indicates the connection between the functions TAPE2, TUNER and PHONO of the AV amplifier 1 and the devices. It is shown that the value of the sixth code takes 16 values from ABA0h to ABAFh in the hexadecimal numeral. ABA0h indicates that any device is not connected to any of the functions TAPE2, TUNER and PHONO of the AV amplifier 1, but connected device information of the function PHONO is not indicated. ABAFh indicates that the device TAPE1 is connected to the function TAPE2, and the device TUNER is connected to the function TUNER, of the AV amplifier 1, but the connected device information of the function PHONO is not indicated.

As described above, the information of functions of the AV amplifier 1 and devices connected to the respective functions, shown in FIG. 10 to FIG. 13 is transmitted from the remote control device 8 to the control box 2 through infrared rays, according to the data format shown in FIG. 11. The control box 2 having received the information detects whether each device is connected to each function of the AV amplifier as in the information, for each input of the respective functions.

A second system configuration to which the remote control device 8 of the present invention is applied will be described below.

Figure 14:
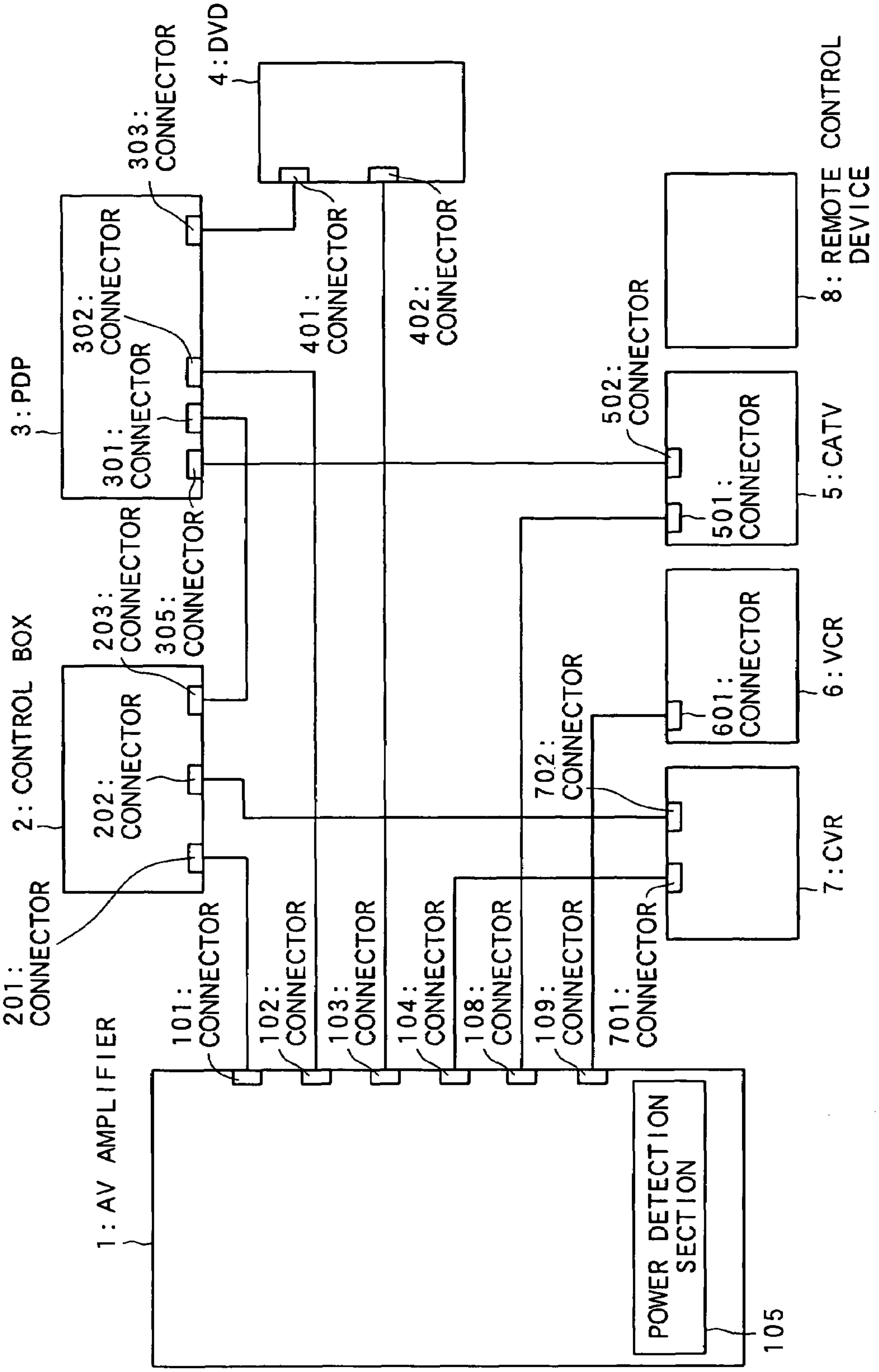
FIG. 14 is a block diagram of a second system configuration in the embodiment.

FIG. 14 shows the second system configuration example in a block diagram.

This system configuration roughly comprises an AV amplifier 1, a control box 2, a PDP 3, a DVR 4, a CATV (Cable Television) 5 as information reproduction equipment, a VCR (Video Cassette Recorder) 6 as information reproduction equipment, a VCR 7 and a remote control device 8.

The parts same as those in the first system configuration are denoted by the same name and same number, and the description thereof is omitted.

The CATV 5 and the PDP 3 transfer picture signals and speech signals therebetween via a connector 502 and a connector 305. The CATV 5 and the AV amplifier 1 transfer picture signals and speech signals therebetween via a connector 501 and a connector 108. The VCR 6 and the AV amplifier 1 transfer picture signals and speech signals therebetween via a connector 601 and a connector 109.

The remote control device 8 transmits a remote control signal to a communication section 2B (see FIG. 3) in the control box 2 through infrared rays. The AV amplifier 1, the PDP 3, the DVR 4, the CATV5, the VCR6 and the VCR 7 then perform desired operation, such as recording, reproduction or display, based on the remote control signal input to the control box 2.

As described above relating to the above embodiment, since the names of devices displayed on the remote control device 8 become the same names of the devices connected to the AV amplifier 1, the operability of the remote control device 8 for the operator is improved.

Since a specific name of equipment connected to the function of the AV amplifier 1 is displayed on the display of the remote control device 8 according to the embodiment (in this embodiment, for example, "DVD4" is displayed), the operator can enjoy the audio system, without having much stress.

Moreover, even if the remote control device 8 and the AV amplifier 1 are apart from each other, desired remote control can be performed, due to the remote control through infrared rays.

Remote control is also possible in the information processing equipment for AV.

Furthermore, since the power information of the equipment connected to the AV amplifier 1 can be obtained, the operability can be further improved.

In this embodiment, the control box 2 is shown as an independent device, but it is possible to install the function of the control box 2 integrally in the AV amplifier 1. Alternatively, the function of the control box 2 can be installed integrally in the device connected to the AV amplifier 1.

In this embodiment, the remote control device 8 is shown as an independent device, but it is possible to install the function of the remote control device 8 integrally in the AV amplifier 1. Alternatively, the function of the remote control device 8 can be installed integrally in the device connected to the AV amplifier 1.

Moreover, in this embodiment, the processing in each step of from step S1 to step S5 in FIG. 4 is executed by an external computer, but the processing may be executed by the remote control device 8. It is also possible to register a new device name with respect to a new function name by the editor software.

The entire disclosure of Japanese Patent Application No. 2002-282055 filed on Sep. 26, 2002 including the specification, claims, drawings and summary is incorporated herein by reference in its entirety.

What is claimed is:

1. A control unit comprising:

a communication device for communicating a connection information outputted from a remote control operating unit;

a recognition device for recognizing the connection between an information processing equipment and an information reproduction equipment connected to the information processing equipment, based on the connection information, that indicates that the information reproduction equipment is connected to the information processing equipment via a connector that is included in the information processing equipment, wherein the connection information is registered by an operator and outputted from the remote control operating unit; and a control device for controlling the information processing equipment and the information reproduction equipment, based on a control signal output from the remote control operating unit corresponding to the connection between the information processing equipment and the information reproduction equipment connected to the information processing equipment recognized by the recognition device, wherein the control device controls the information processing equipment and the information reproduction equipment, and judges whether to output a signal of the information reproduction equipment to the other information reproduction equipment, or to output a signal transmitted from the information processing equipment to the other information reproduction equipment, based on a control signal output from the remote control operating unit, corresponding to the connection between the information processing equipment and the information reproduction equipment connected to the information processing equipment recognized by the recognition device, and wherein the information processing equipment comprises:

a detection device which detects a presence of the information reproduction equipment connected to the information processing equipment; and a detection result output device which outputs a detection result of the detection device to the control unit.

2. A control unit according to claim 1, wherein signals inputted to the information processing equipment include image signals.

3. A control unit according to claim 1, wherein the connector is an input/output connector.

4. A remote control system comprising:

a remote control operating unit having:

an input device for inputting, from an operator, connection information which indicates information reproduction equipment connected to information processing equipment via a connector that is included in the information processing equipment, a storage device for storing the connection information;

an output device for outputting the connection information; and a control unit having a recognition device for recognizing the connection between the information processing equipment and the information reproduction equipment connected to the information processing equipment, based on the connection information output from the remote control operating unit, wherein the control unit controls the information processing equipment and the information reproduction equipment, based on a control signal output from the remote control operating unit, corresponding to the connection between the information processing equipment and the information reproduction equipment connected to the information processing equipment recognized by the recognition device;

wherein the information processing equipment has a detection device for detecting the presence of the information reproduction equipment connected to the information processing equipment;

wherein the control unit controls the information processing equipment and the information reproduction equipment, and the control unit judges whether to output a signal of the information reproduction equipment to the other information reproduction equipment, or to output a signal transmitted from the information processing equipment to the other information reproduction equipment, based on a control signal output from the remote control operating unit, corresponding to the connection between the information processing equipment and the information reproduction equipment connected to the information processing equipment recognized by the recognition device, and wherein the information processing equipment comprises:

a detection device which detects a presence of the information reproduction equipment connected to the information processing equipment; and a detection result output device which outputs a detection result of the detection device to the control unit.

5. A remote control system according to claim 4, wherein the information reproduction equipment includes a displaying device, and wherein the control unit controls the information processing equipment and the information reproduction equipment, and the control unit judges whether to output a signal of the information reproduction equipment to the displaying device, or to output a signal transmitted from the information processing equipment to the displaying device, based on a control signal output from the remote control operating unit, corresponding to the connection between the information processing equipment and the information reproduction equipment including the displaying device connected to the information processing equipment recognized by the recognition device.

* * * * *